United States Patent Office 3,337,637
Patented Aug. 22, 1967

3,337,637
REDUCTION OF ORGANO-SULFENYL CHLORIDES TO ORGANIC DISULFIDES
Martin B. Neuworth and Robert J. Laufer, Pittsburgh, Pa., assignors, by mesne assignments, to Consolidation Coal Company, Pittsburgh, Pa., a corporation of Delaware
No Drawing. Filed June 22, 1964, Ser. No. 377,084
9 Claims. (Cl. 260—608)

This invention relates to a process for converting organosulfenyl chlorides to disulfides, in accordance with the general equation, $$2RSCl \rightarrow RS-SR + 2Cl^-$$

Sulfenyl chlorides are readily reduced to the disulfides (see page 273 et seq. of volume I, Organic Chemistry of Bivalent Sulfur by E. Emmet Reid, Chemical Publishing Co., New York, N.Y., 1958). Zinc, mercury, potassium hydrosulfide, iodide ions, sodium thiosulfate, or lithium aluminum hydride may be used as reducing agents. Unfortunately, all of the reducing agents used for the conversion or organosulfenyl chlorides to the disulfides present problems which seriously affect the economics of the process. For example, zinc which is quite effective, if not the most effective, is relatively expensive, requires the use of a solvent, and produces a solid by-product, zinc chloride, that must be removed from the desired product by a washing operation of some sort.

In accordance with the present invention, we have found a reducing agent which is as effective as the best hitherto used; is cheaper; and requires neither solvent nor catalyst. The reducing agent of our invention is phosphorus. Its reaction with organosulfenyl chlorides is as follows:

$$6RSCl + 2P \rightarrow 3RS-SR + 2PCl_3$$

Another advantage in the use of phosphorus is the volatility of the by-product $PCl_3$ which may be readily separated from the desired product by distillation. Furthermore, white phosphorus, which is the preferred commercial allotrope of phosphorus, is a liquid so that addition of the phosphorus to the reaction may be readily controlled. Such controlled addition is desirable in view of the exothermicity of the reaction.

The reaction itself is uncomplicated with few, if any, side reactions. The reaction is best carried out at 50–100° C. by the slow addition of a small excess of phosphorus to the organosulfenyl chloride. Reaction takes place rapidly, especially near 100° C., and the rate is easily controlled by mild external cooling and by the rate of phosphorus addition. After the reaction is complete, most of the $PCl_3$ formed may be recovered by atmospheric distillation, or alternatively, may be hydrolyzed by the careful addition of water. The product disulfide may be recovered by distillation or crystallization.

In the laboratory, red phosphorus is preferred because of its relative ease of handling from a safety standpoint. Commercially, the pyrophoric white form of phosphorus is preferred because of its substantially lower cost. White phosphorus (M.P. 44° C.) may be handled as a liquid, dissolves completely in the reaction mixture, and is more reactive than red phosphorus. These factors permit better control of the reaction. Equally good yields, however, may be achieved with either form of phosphorus.

Phosphorus reduction of organosulfenyl chlorides is of particular interest in connection with the synthesis of nuclearly chlorinated aromatic mercaptans. This synthesis is described and claimed in the copending application of R. J. Laufer, Ser. No. 376,902, filed June 22, 1964. In this synthesis, a thiophenol is chlorinated to form a nuclearly chlorinated benzene sulfenyl chloride. The latter is then heated to about 50° C. and the required amount of phosphorus added. The temperature is allowed to rise during the reaction to 90–110° C. where it is maintained for an hour or less to complete the reaction. The resulting solution consists of the disulfides and phosphorus trichloride. The reduction of the disulfides to nuclearly chlorinated aromatic mercaptans may be accomplished by many standard methods as described in the above-mentioned application.

The removal of the chlorine atom by the use of phosphorus in accordance with this invention is independent of the nature of the organic radical "R" which is attached to the sulfur atom. Accordingly, for the purpose of this invention, R is defined simply as an organic radical which may be either aromatic or aliphatic. Of course, if there are substituents on the organic radical which themselves react with phosphorus, then such side reactions will affect the yield of the desired main product. We are especially interested, as illustrated by the following examples, in the aryl groups, particularly phenyl and alkyl phenyl groups, chlorinated and non-chlorinated. However, we believe we are the first to establish that the chlorine atom can be effectively cleaved from the organosulfenyl group by means of phosphorus to yield disulfides in high yield.

For a better understanding of our invention, reference should be had to the following examples:

EXAMPLE 1

*Reaction of phosphorus with benzenesulfenyl chloride*

A 100 ml., 3-necked flask equipped with magnetic stirrer, thermometer, and distilling adapter leading to a receiver protected from atmospheric moisture, was charged with 98.8 grams of benzenesulfenyl chloride. The apparatus was provided with a slow purge of dry nitrogen. Over a period of 35 minutes, 8.5 grams (120 percent of the stiochiometric amount) of powdered red phosphorus was added in small increments. External cooling was used to limit the temperature to a maximum 43° C. The temperature began to fall within a few minutes after the phosphorus addition was complete. The reaction mixture was then heated and distillate collected at a pot temperature of 111–165° C./atmospheric pressure and then to 167° C./water pump vacuum. The receiver was cooled in an ice bath to prevent evaporation of the distillate. The latter was a pungent, fuming, colorless liquid, B.P. 74–80° C., $d^{20}$ 1.54, $n_D^{25}$ 1.5145, weighing 24.3 grams. The distillate reacted vigorously with 100 ml. of cold water. Extraction of the resulting aqueous solution with ether and removal of the ether from the extract yielded ca. 0.2 gram of diphenyl disulfide. Recovered $PCl_3$ corresponded to 77 percent of theory.

This distillation residue (82.2 grams), a light amber oil which solidified near 50° C., was dissolved in 30 ml. of heptane and filtered to yield 1.20 grams of a red powder, presumably unreacted phosphorus. The filtrate was distilled to give a 91 percent yield of diphenyl disulfide as determined by melting point (55.0–58.5° C.) and vapor phase chromatography.

EXAMPLE 2

*Reaction of 4-chloro-m-toluenesulfenyl chloride with phosphorus*

A reaction flask containing 4-chloro-m-toluenesulfenyl chloride was fitted with a distillation head, condenser, and receiver protected by a drying tube. A twenty percent excess of red phosphorus was added in portions from an Erlenmeyer flask attached to the reaction flask by a short length of Gooch tubing. The temperature was permitted to rise to 55° C. and was maintained mostly near 50° C. by moderate external cooling. The reaction continued until the temperature gradually began to drop.

Heat was then applied and $PCl_3$ distilled from the reaction mixture at a pot temperature of 100–160° C. The distillate was redistilled on a 1″ x 24″ glass helices-packed column at atmospheric presssure to yield a colorless distillate, B.P. 74° C. $d^{20}$ 1.565, $n_D^{25}$ 1.5108. Reported for $PCl_3$ (N. A. Lange, Handbook of Chemistry, 10th Edition, 1961): B.P. 75.95° C./760 mm., $d^{20.8}$ 1.574, $n_D^5$ 1.5032.

The residue, after the removal of $PCl_3$, was established to be bis-4-chloro-m-tolyl disulfide.

In similar fashion, the following organosulfenyl chlorides were reduced by phosphorus to the corresponding organo disulfides, 4-chloro-o-toluenesulfenyl chloride, 6-chloro-o-toluenesulfenylchloride, and 2-chloro-p-toluenesulfenyl chloride.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of converting organosulfenyl chlorides to disulfides which comprises reacting an organosulfenyl chloride selected from the class consisting of benzenesulfenyl chloride, toluenesulfenyl chlorides, chlorinated benzenesulfenyl chloride and chlorinated toluenesulfenyl chlorides with phosphorus whereby the S—Cl group in said organosulfenyl chloride is cleaved to yield the corresponding diorgano disulfide and phosphorus chloride, and recovering the diorgano disulfide from the resulting product.

2. The method of converting an arylsulfenyl chloride selected from the class consisting of benzenesulfenyl chloride, toluenesulfenyl chlorides, chlorinated benzenesulfenyl chloride and chlorinated toluenesulfenyl chlorides to a disulfide which comprises reacting said arylsulfenyl chloride with phosphorus at a temperature of about 50 to 100° C., whereby the S—Cl group in said arylsulfenyl chloride is cleaved to yield the corresponding diaryl disulfide and phosphorus chloride, and recovering a diaryl disulfide from the resulting product.

3. The method of converting arylsulfenyl chlorides to disulfides which comprises reacting an arylsulfenyl chloride selected from the class consisting of benzensulfenyl chloride, toluenesulfenyl chlorides, chlorinated benzenesulfenyl chloride and chlorinated toluenesulfenyl chlorides with phosphorus at a temperature of about 50 to 100° C., whereby the S—Cl group in said arylsulfenyl chloride is cleaved to yield the corresponding diaryl disulfide and phosphorus chloride, distilling phosphorus trichloride from the resulting product, and recovering diaryl disulfide.

4. The method of claim 3 in which the arylsulfenyl chloride is a nuclearly chlorinated toluenesulfenyl chloride.

5. The method of claim 3 in which the arylsulfenyl chloride is benzenesulfenyl chloride.

6. The method of claim 3 in which the arylsulfenyl chloride is 4-chloro-m-toluenesulfenyl chloride.

7. The method of converting an organosulfenyl chloride selected from the class consisting of benzenesulfenyl chloride, toluenesulfenyl chlorides, chlorinated benzenesulfenyl chloride and chlorinated toluenesulfenyl chlorides to disulfides which comprises adding a stiochiometrically excess amount of phosphorus to said organosulfenyl chloride, maintaining the resulting mixture at a temperature of about 50 to 100° C., whereby the S—Cl group in said organosulfenyl chloride is cleaved to yield the corresponding diorgano disulfide and phosphorus chloride, and recovering said diorgano disulfide from the product.

8. The method of claim 7 in which the organosulfenyl chloride is benzenesulfenyl chloride.

9. The method of claim 7 in which the organosulfenyl chloride is 4-chloro-m-toluenesulfenyl chloride.

References Cited

UNITED STATES PATENTS 3,150,176  9/1964  Foley _____ 260—543

OTHER REFERENCES

Petrov et al., Chemical Abstracts, vol. 55, pp. 27018–19.

CHARLES B. PARKER, *Primary Examiner.*

DELBERT R. PHILLIPS, *Assistant Examiner.*